US010084937B2

(12) United States Patent
Nagai

(10) Patent No.: US 10,084,937 B2
(45) Date of Patent: Sep. 25, 2018

(54) IMAGE FORMING APPARATUS, IMAGE FORMING METHOD, AND STORAGE MEDIUM FOR CORRECTING DENSITY NONUNIFORMITY

(71) Applicant: CANON KABUSHIKI KAISHA, Tokyo (JP)

(72) Inventor: Jun Nagai, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/410,565

(22) Filed: Jan. 19, 2017

(65) Prior Publication Data
US 2017/0223224 A1 Aug. 3, 2017

(30) Foreign Application Priority Data
Jan. 29, 2016 (JP) .................. 2016-016363

(51) Int. Cl.
H04N 1/387 (2006.01)
H04N 1/407 (2006.01)
H04N 1/405 (2006.01)
H04N 1/60 (2006.01)
G03G 13/34 (2006.01)
G03G 15/00 (2006.01)
B41J 2/045 (2006.01)

(52) U.S. Cl.
CPC .......... *H04N 1/3877* (2013.01); *G03G 13/34* (2013.01); *G03G 15/5066* (2013.01); *H04N 1/405* (2013.01); *H04N 1/4078* (2013.01); *H04N 1/60* (2013.01); *B41J 2/04508* (2013.01); *G03G 2215/00029* (2013.01); *H04N 2201/0094* (2013.01)

(58) Field of Classification Search
None
See application file for complete search history.

(56) References Cited

U.S. PATENT DOCUMENTS 5,140,349 A * 8/1992 Abe ..................... H04N 1/0411
347/129
6,674,551 B1 * 1/2004 Takura ................... G06T 3/403
358/451

FOREIGN PATENT DOCUMENTS

JP 2006349851 A 12/2006
JP 2014215504 A * 11/2014

* cited by examiner

*Primary Examiner* — Thomas D Lee
(74) *Attorney, Agent, or Firm* — Canon U.S.A., Inc. IP Division

(57) ABSTRACT

An image forming apparatus receives a print setting for image data, determines a density correction table to be applied to a position of a pixel in the image data based on the received print setting from among a plurality of stored density correction tables, and corrects a density of the image data using the determined density correction table.

8 Claims, 11 Drawing Sheets

FIG. 7
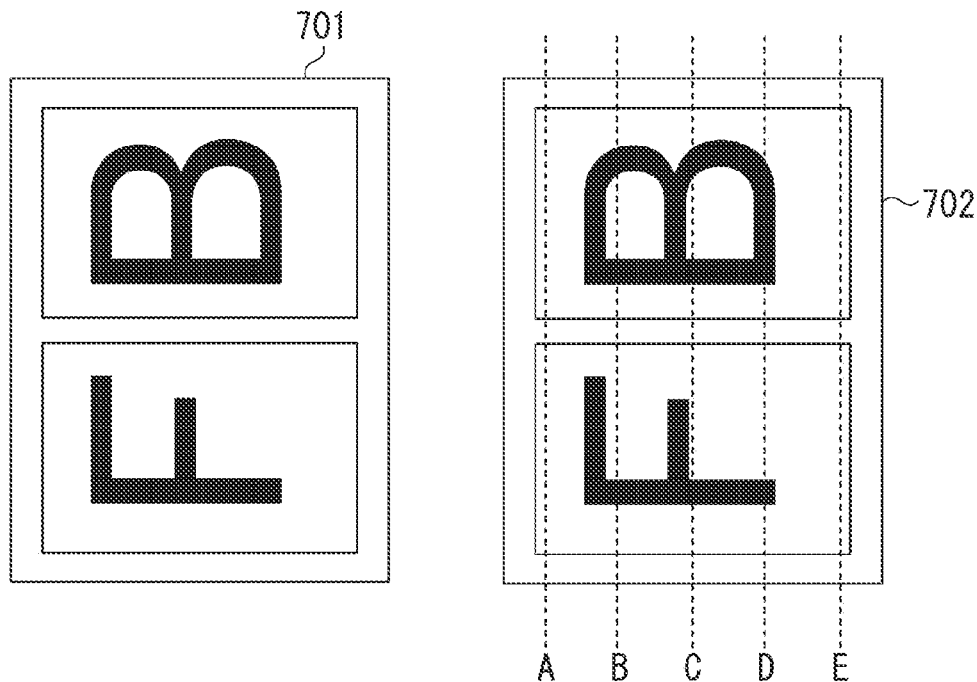
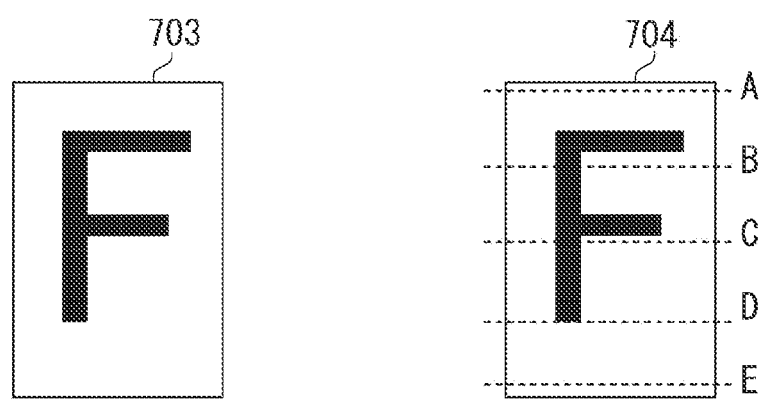
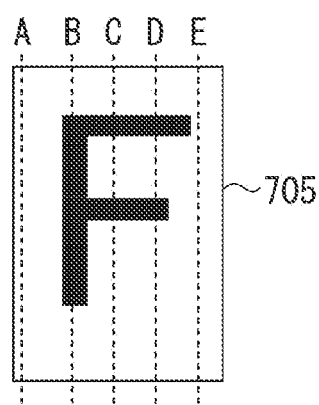

IMAGE FORMING APPARATUS, IMAGE FORMING METHOD, AND STORAGE MEDIUM FOR CORRECTING DENSITY NONUNIFORMITY

BACKGROUND

Field of the Disclosure

The present disclosure generally relates to image forming and, more particularly, to an image forming apparatus, an image forming method, and a storage medium having a function of correcting density nonuniformity of an image.

Description of the Related Art

In recent years, in an image forming apparatus, demands have been made for an output image to have a high image quality. On the other hand, density nonuniformity may occur due to various factors in the output image. Main density nonuniformity in the image forming apparatus using an electrophotographic method includes charging nonuniformity due to deterioration of a charger which charges a photosensitive drum, exposure nonuniformity in a laser scanner or the like for forming an electrostatic latent image on the photosensitive drum, or development nonuniformity in a developer which develops the electrostatic latent image.

The exposure nonuniformity is found to occur because an exposure amount and a spot diameter differ depending on a position in a main-scanning direction when the electrostatic latent image is formed on the photosensitive drum with a laser beam from an exposure device, and occurs as nonuniformity in the main-scanning direction. In a conventional technique, the density nonuniformity occurring in the main-scanning direction has been corrected depending on the exposure amount of the exposure device.

Further, the density nonuniformity in the main-scanning direction is known to have a distribution which differs depending on the density of an image to be output. In the correction of the density nonuniformity depending on the exposure amount of the exposure device, the density nonuniformity can be corrected only in a certain density range. On the other hand, a technique described in Japanese Patent Application Laid-Open No. 2006-349851 discusses creating a density correction table for each position in a main-scanning direction and applying the density correction table to an image depending on the position in the main-scanning direction to correct density nonuniformity in the main-scanning direction in an entire density range.

In the above-described technique described in Japanese Patent Application Laid-Open No. 2006-349851, the density correction table corresponding to the position in the main-scanning direction is applied to image data to be output. However, if layout processing such as rotation and position adjustment of an image is performed after density correction is performed using the density correction table, the image rotates by 90 degrees, for example, so that the density correction table corresponding to the position in the main-scanning direction is applied to each of positions in a sub-scanning direction of the image. Thus, appropriate density correction cannot be performed to suppress the density nonuniformity in the main-scanning direction.

SUMMARY

The present disclosure is directed to providing an image forming apparatus capable of correcting density nonuniformity in a main-scanning direction of an image forming area with high accuracy even when a layout of an image is changed after density correction of the image.

According to an aspect of the present disclosure, an image forming apparatus, which corrects a density characteristic in a main-scanning direction using a density correction table corresponding to a position in the main-scanning direction in an image forming area, includes a storage unit configured to store a plurality of density correction tables respectively corresponding to a plurality of positions in the main-scanning direction, an input unit configured to input image data, a receiving unit configured to receive a print setting for the image data, a determination unit configured to determine a density correction table applied to a position of a pixel in the image data based on the print setting received by the receiving unit from among the plurality of density correction tables stored by the storage unit, and a correction unit configured to correct a density of the pixel in the image data using the density correction table determined by the determination unit.

Further features of the present disclosure will become apparent from the following description of exemplary embodiments with reference to the attached drawings.

BRIEF DESCRIPTION OF THE DRAWINGS

FIG. 7 illustrates an example of position information calculation according to one or more aspects of the present disclosure.

DESCRIPTION OF THE EMBODIMENTS

Exemplary embodiments for implementing aspects of the present disclosure will be described below with reference to the drawings. While a case where aspects of the present disclosure are applied to a multifunction printer (MFP)

serving as an electrophotographic color image forming apparatus will be described below as an exemplary embodiment, the spirit of the present disclosure is not limited to this. The present disclosure is applicable to an ink-jet image forming apparatus and a sublimation image forming apparatus without departing from the spirit of the present disclosure.

Figure 1:
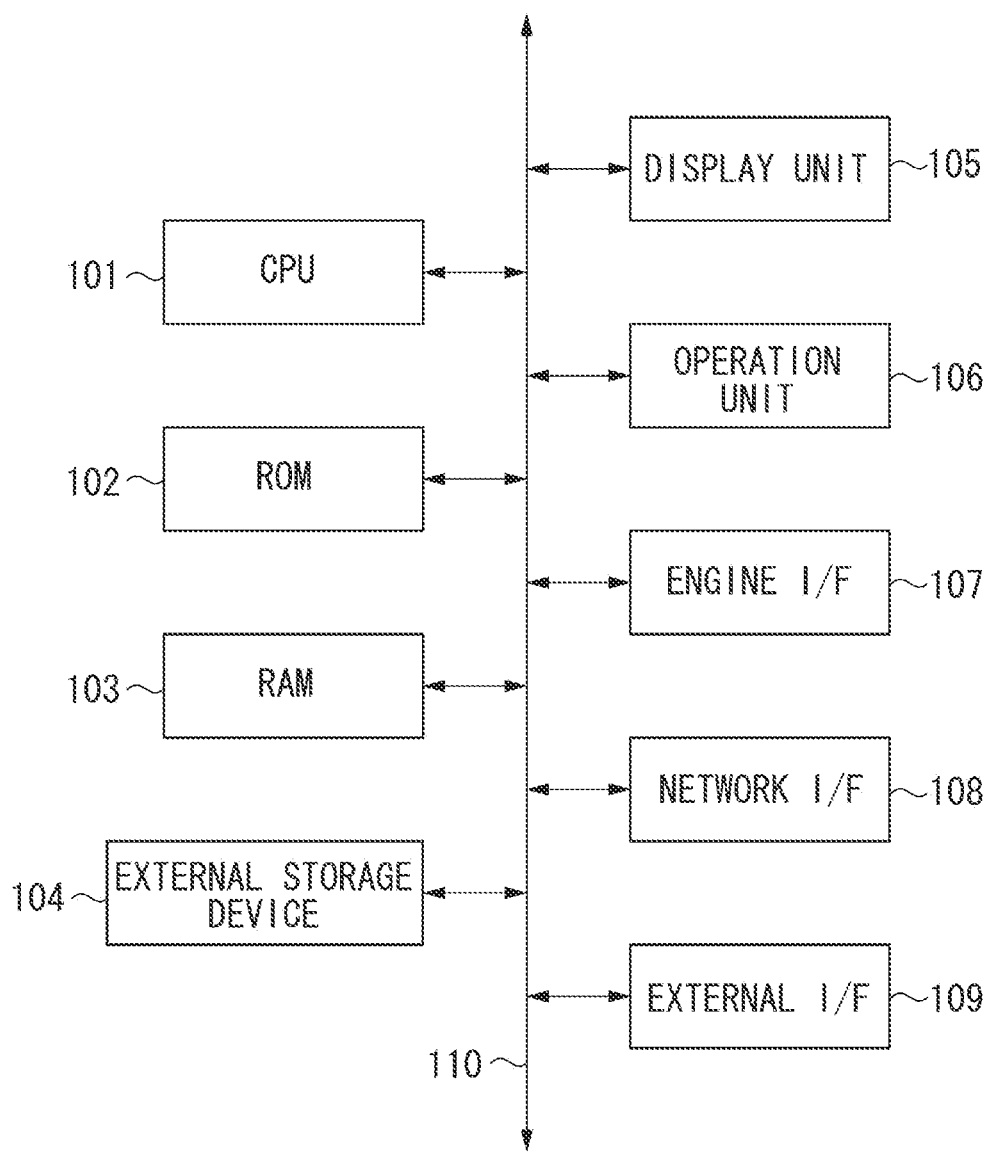
FIG. 1 is a block diagram illustrating a basic configuration of an image processing apparatus according to one or more aspects of the present disclosure.

FIG. 1 is a block diagram illustrating a basic configuration of an image processing apparatus according to a first exemplary embodiment. The image processing apparatus performs various types of control of an image forming apparatus. The image processing apparatus includes a central processing unit (CPU) 101, which may include one or more processors and one or more memories, a read-only memory (ROM) 102, a random access memory (RAM) 103, an external storage device 104, a display unit 105, an operation unit 106, an engine interface 107, a network interface 108, an external interface 109, and a system bus 110. As used herein, the term "unit" generally refers to hardware, firmware, software or other component, such as circuitry, alone or in combination thereof, that is used to effectuate a purpose.

The above-described configuration is specifically described as follows. The CPU 101 performs control of the entire image processing apparatus and calculation processing, for example, and performs each of processes, described below, based on a program stored in the ROM 102. The ROM 102 is a storage area for a system startup program, a program for controlling a printer engine 209 illustrated in FIG. 2, and data such as character data and character code information. Font data added and registered by downloading is stored in the RAM 103, and a program and data are loaded into the RAM 103 for each of the various processes. Further, various types of programs are loaded into the RAM 103, and are executed by the CPU 101. The RAM 103 can also be used as a data storage area for received image data. The external storage device 104 includes a hard disk, for example. The external storage device 104 is used as an area into which data is spooled, which stores a program, each information file, and image data, and in which the CPU 101 is to work.

The display unit 105 includes a liquid crystal display device, for example, and performs various types of display under the control of the CPU 101. The display unit 105 is used to display a setting status of the image forming apparatus, a current process inside the image forming apparatus, and an error status. The operation unit 106 is used for a user to instruct the image forming apparatus to change and reset a setting. The operation unit 106, together with the display unit 105, provides a user interface. For example, the operation unit 106 can display an operation screen for receiving designation of printing conditions such as settings of a layout and enlargement, reduction, and rotation on the display unit 105.

The engine interface 107 is an interface which inputs and outputs a command or the like for controlling a printer engine. The network interface 108 is an interface for connecting the image processing apparatus to a network. For example, the image processing apparatus receives image data and a drawing command from a host computer via the network and the network interface 108. The external interface 109 is connected to a scanner or a digital camera serving as an image input device via a parallel or serial interface, for example. The system bus 110 functions as a data path among the above-described components.

A processing procedure illustrated in a flowchart, described below, is stored in any one of the ROM 102, the RAM 103, and the external storage device 104, and is executed by the CPU 101.

Figure 2:
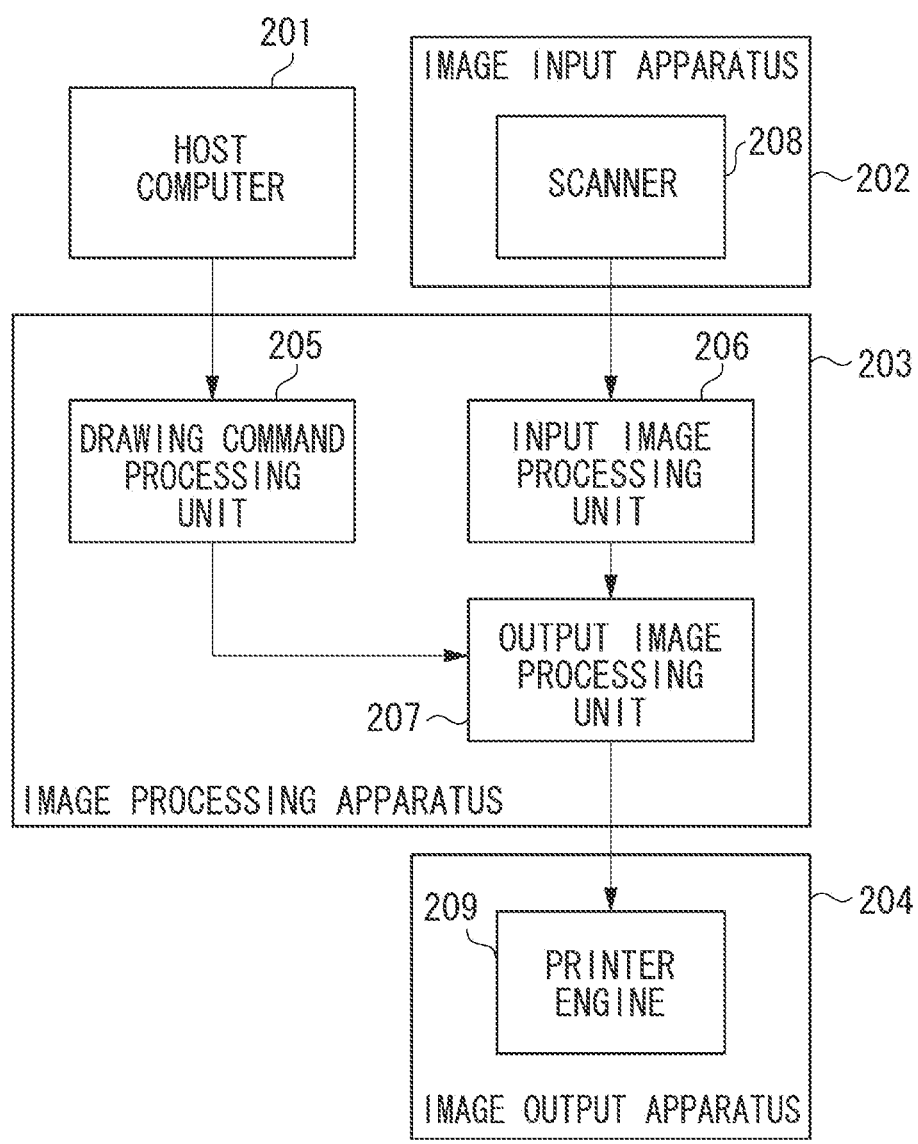
FIG. 2 is a block diagram illustrating a configuration of an image forming apparatus according to one or more aspects of the present disclosure.

FIG. 2 is a block diagram illustrating a configuration of the image forming apparatus according to the present exemplary embodiment. The image forming apparatus is an MFP including an image input apparatus 202, an image processing apparatus 203, and an image output apparatus 204. Each of functional units in the image processing apparatus 203 may be implemented by the CPU 101 executing a predetermined program stored in the ROM 102, or some or all of the functional units may be respectively implemented by a dedicated integrated circuit (IC).

Processing for receiving a drawing command transmitted from a host computer 201 to perform printing will be described below with reference to FIG. 2.

An application operating on the host computer 201 creates a page layout document, a word processor document, and a graphic document. Such digital document data created by the application is transmitted to a printer driver (not illustrated), and a drawing command based on the digital document data is generated. The digital document data transmitted to the printer driver is not limited to that created by the host computer 201. The digital document data may be created by an application in another computer or a scanner and stored in the host computer 201.

A Page Description Language (PDL) for generating page image data is general as a generated drawing command. The drawing command generally includes print settings about a printing resolution, the number of copies, a page layout, and a printing order, as control instructions, together with instructions to draw data such as image data, graphics data, and text data. The drawing command generated by the printer driver is transmitted to the image processing apparatus 203 via the network. The image processing apparatus 203 generates image data having an image format which can be formed by the image output apparatus 204 based on the drawing command received from the host computer 201.

The image processing apparatus 203 includes a drawing command processing unit 205, an input image processing unit 206, and an output image processing unit 207. The drawing command processing unit 205 performs analysis processing for the drawing command received from the host computer 201 to generate a drawing object, and further performs rasterization processing to generate a bit map image. In this case, an instruction to control the print settings included in the drawing command, e.g., the print setting about the layout is also extracted.

The output image processing unit 207 performs image processing such as color conversion processing and halftone processing depending on the print settings for the generated bit map image, and converts the bit map image into image data having an image format which can be processed by the printer engine 209. The image data thus generated is transmitted to the image output apparatus 204 via the engine interface 107. Details of processes performed by the output image processing unit 207 will be described below.

The image output apparatus 204 is connected to the image processing apparatus 203, and includes the printer engine 209. The printer engine 209 receives image data generated in a previously determined image format from the image processing apparatus 203, and prints the received image data on a surface of a fed transfer sheet. More specifically, printing on a surface of a sheet serving as a transfer material is completed via exposure, development, transfer, and fixing processes.

By the above-described processes, processing for printing an image based on the drawing command from the host computer 201 is completed.

Processing for printing a bit map image input from the image input apparatus 202 including a scanner 208 will be described. The scanner 208 is connected to the image processing apparatus 203 via the external interface 109. The scanner 208 optically scans an image printed on a sheet or a film, measures the intensity of light reflected or transmitted by the image, and converts the image from analog to digital, to read the bit map image. The acquired bit map image is generally a Red Green Blue (RGB) image.

The bit map image received by the scanner 208 is supplied to the input image processing unit 206.

The input image processing unit 206 performs well-known image processing such as shading correction, interline correction, and color correction for the received bit map image. When the output image processing unit 207 then subjects the received bit map image to image processing, the bit map image is converted into an image format which can be received by the printer engine 209.

Image data thus generated is transferred to the printer engine 209. The printer engine 209 outputs an image onto a sheet surface. By the above-described processes, processing for printing the bit map image input from the image input apparatus 202 including the scanner 208 is completed.

There is a case where not the drawing command but bit map image data or image data, which has been subjected to Joint Photographic Experts Group (JPEG) compression, is received from the host computer 201. In the case, the image data received from the host computer 201 is input to the input image processing unit 206.

Figure 3:
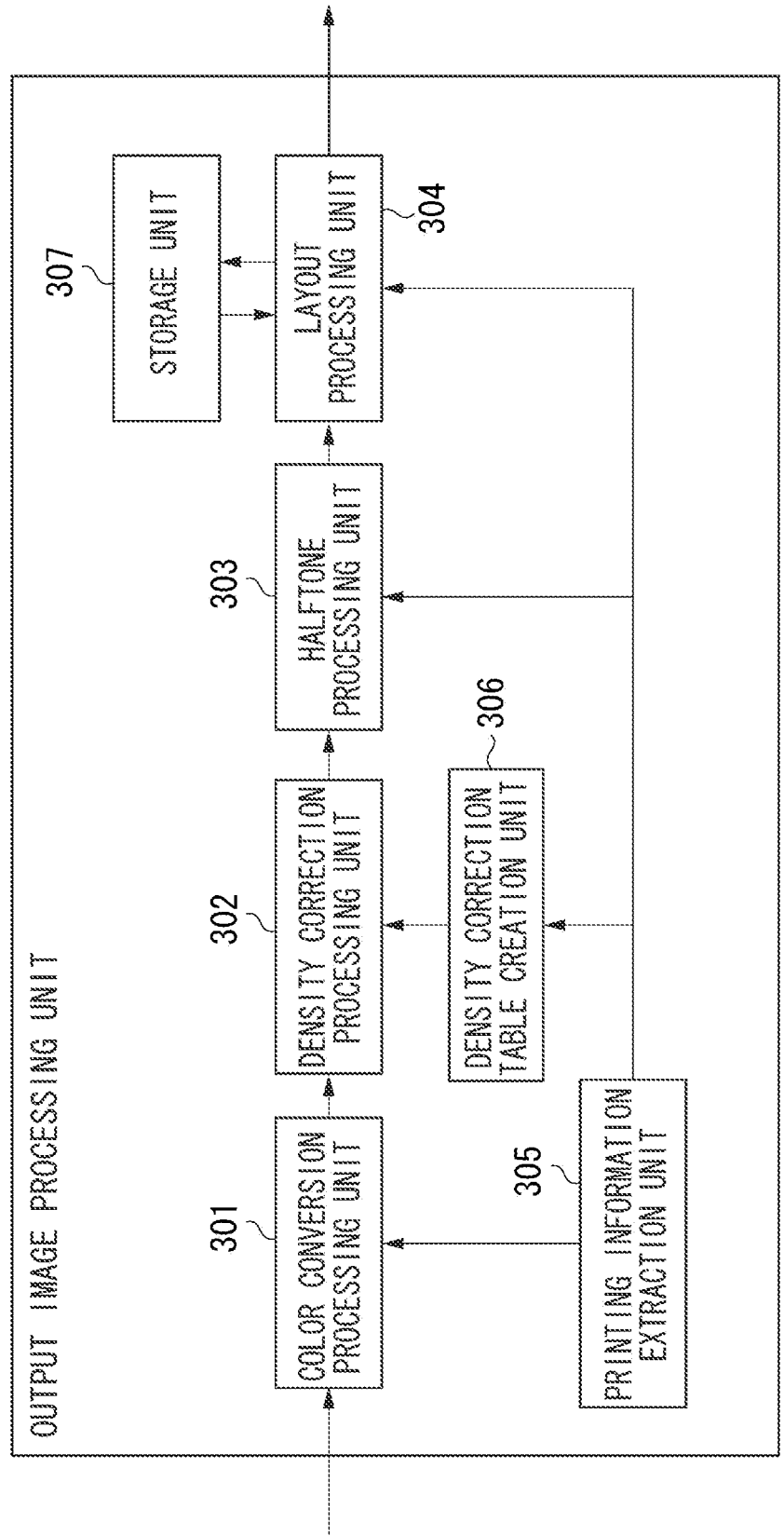
FIG. 3 is a block diagram illustrating a configuration of an output image processing unit according to one or more aspects of the present disclosure.

FIG. 3 is a block diagram illustrating a configuration of the output image processing unit 207.

A printing information extraction unit 305 extracts printing information for switching a condition of each of the processes in the output image processing unit 207 based on the print settings included in the drawing command and the print settings received by the operation unit 106. Thus, a color conversion processing unit 301 and a halftone processing unit 303 can respectively perform processes corresponding to the print settings. Information such as a resolution during engine output and size information of a sheet serving as a transfer material are also extracted in addition to layout information such as rotation information and position adjustment information.

The color conversion processing unit 301 performs conversion processing for converting RGB color space image data input from the drawing command processing unit 205 or the input image processing unit 206 into Cyan Magenta Yellow Black (CMYK) color space image data corresponding to toners in four colors, i.e., CMYK colors for image formation by the printer engine 209.

A density correction processing unit 302 subjects the CMYK color space image data obtained by the color conversion processing to density correction processing, and performs gamma correction for correcting a density characteristic specific to the printer engine 209. As a specific processing method, correction is performed by applying a density correction table for associating an input density level and an output density level with respect to each of the CMYK colors. A density correction table creation unit 306 creates the density correction table to be applied. In the present exemplary embodiment, the density correction table becomes a density correction table also including correction of density nonuniformity in a main-scanning direction of an image forming area. Details of the density correction table creation unit 306 will be described below.

The halftone processing unit 303 performs halftone processing for the CMYK color space image data which has been subjected to the density correction in the density correction processing unit 302. The printer engine 209 may be able to generally output only low gray levels such as 2, 4, and 16 gray levels. Therefore, even in the printer engine 209 which can output only a small number of gray levels, the halftone processing unit 303 performs halftone processing such as error diffusion processing and dither processing so that stable halftone representation is possible. The image data, which has been subjected to the halftone processing by the halftone processing unit 303, is stored once in a storage unit 307 via a layout processing unit 304.

The layout processing unit 304 performs rotation processing and imposition processing for the image data stored in the storage unit 307 based on the layout information extracted by the printing information extraction unit 305 to generate image data of one page. The layout processing unit 304 transmits the generated image data to the printer engine 209 to print the image data on a surface of a transfer sheet.

Processes performed by the density correction table creation unit 306 will be described below.

Figure 4:
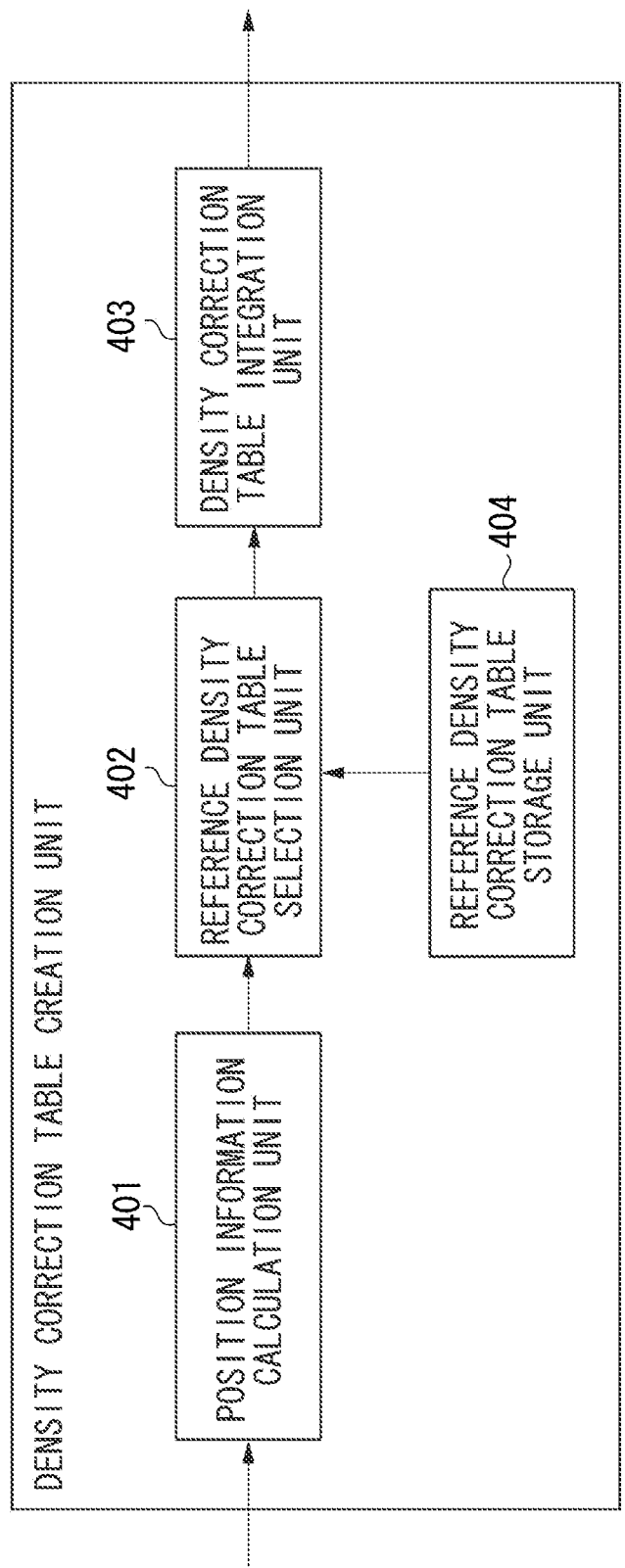
FIG. 4 is a block diagram illustrating a configuration of a density correction table creation unit according to one or more aspects of the present disclosure.

FIG. 4 is a block diagram illustrating a configuration of the density correction table creation unit 306. In the present exemplary embodiment, the density correction processing is performed by applying a density correction table associated with a position in the main-scanning direction of the image forming area. First, a position information calculation unit 401 calculates a drawing position in the main-scanning direction of the image forming area for each of pixels in image data from the printing information extracted by the printing information extraction unit 305. A reference density correction table selection unit 402 then selects reference density correction tables to be a basis in creating the density correction table from information about the calculated drawing position. Each of the reference density correction tables has a reference position. One or more reference density correction tables are selected from the drawing position information about each of the pixels and the reference position of each of the reference density correction tables. A density correction table integration unit 403 creates the density correction table to be applied based on the selected reference density correction table or tables and the drawing position information about each of the pixels.

Figure 5:
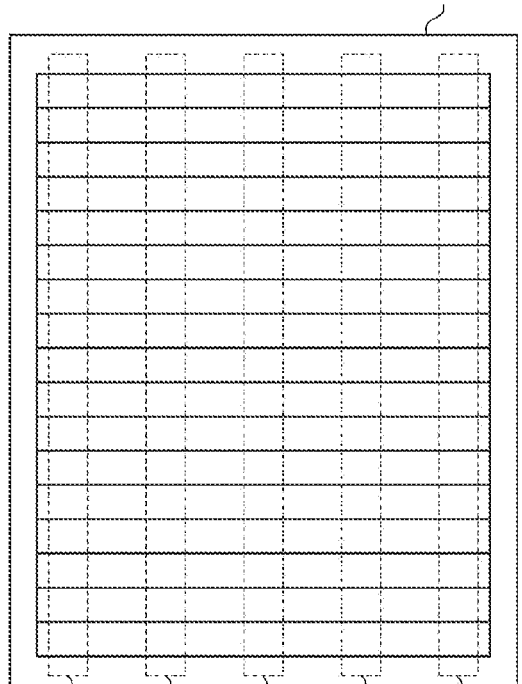
FIG. 5 illustrates a method for creating a reference density correction table according to one or more aspects of the present disclosure.

FIG. 5 is a conceptual diagram illustrating a method for creating the reference density correction tables. A pattern 501 illustrated in FIG. 5 is a reference density correction table creation pattern according to the present exemplary embodiment. The reference density correction table creation pattern is a pattern having uniform density areas, each having a predetermined width in a sub-scanning direction and extending in the main-scanning direction, arranged therein in the sub-scanning direction. Image signals of the uniform density areas respectively have 17 gray levels, i.e., 00h, 10h, 20h, 30h, 40h, 50h, 60h, 70h, 80h, 90h, A0h, B0h, C0h, D0h, E0h, F0h, and FFh. The reference density correction table creation pattern is subjected to halftone processing, and is output. The reference density correction table is created for each of the CMYK colors, and the reference density correction table creation pattern corresponding to each of the CMYK colors is also output.

When processing for outputting the reference density correction table creation pattern ends, an output pattern image 502 is read by the scanner 208 or a density measurement device, and an image density of each of areas 502a, 502b, 502c, 502d, and 502e in the read pattern image 502 is detected. When the respective densities of the areas 502a, 502b, 502c, 502d, and 502e are detected, five reference density correction tables A, B, C, D, and E respectively corresponding to positions in the main-scanning direction of a target line in the image forming area can be created. More specifically, when the respective densities of the areas 502a, 502b, 502c, 502d, and 502e in the main-scanning direction differ from one another, the reference density correction tables A, B, C, D, and E are created so that the respective densities of the areas in the main-scanning direction of the output pattern image 502 become equal to one another. The number of reference density correction tables is not limited to five. Density detection positions in the pattern image 502 need not be equally spaced apart from one another in the main-scanning direction, but may be sparsely or densely spaced apart from one another. When the reference density correction tables A, B, C, D, and E are created, the respective density detection positions in the main-scanning direction are respective reference positions of the reference density correction tables. A method for creating the reference density correction tables for matching an ideal density characteristic based on the measured densities in the pattern image 502 is a known technique, and hence detailed description thereof is omitted. The reference density correction tables thus created, together with the reference positions, are stored in a reference density correction table storage unit 404.

Figure 6:
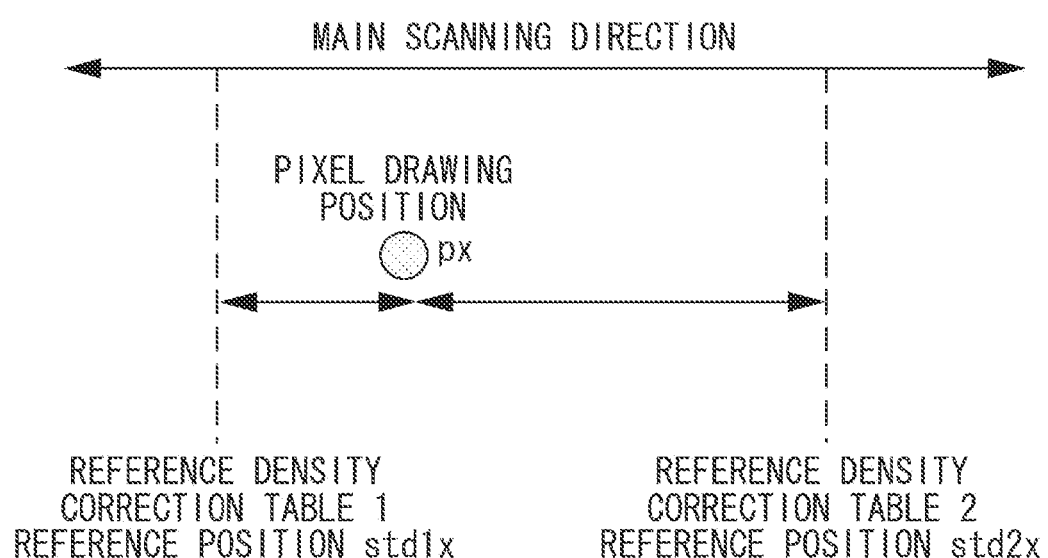
FIG. 6 illustrates a method for creating a density correction table according to one or more aspects of the present disclosure.

FIG. 6 is a conceptual diagram illustrating a method for creating a density correction table. Reference positions of reference density correction tables respectively correspond to positions in the main-scanning direction of the image forming area, densities of which have been detected when the reference density correction tables are created. A position in the main-scanning direction of each of pixels in image data to which the density correction processing is applied is calculated by the position information calculation unit 401 as a pixel drawing position, and is compared with the reference position of each of the reference density correction tables. As a result, the reference density correction table selection unit 402 selects a reference density correction table 1 and a reference density correction table 2 so that an expression of a reference position std1x of the reference density correction table 1<a pixel drawing position px< a reference position std2x of the reference density correction table 2 holds, as illustrated in FIG. 6. The density correction table integration unit 403 integrates the two selected reference density correction tables 1 and 2 to create the density correction table from a relationship between the reference density correction table 1, the reference density correction table 2, and the respective reference positions and the pixel drawing position.

The density correction table is a table for associating an input density level and an output density level with each other. Letting StdLut1 and StdLut2 be respectively the reference density correction table 1 and the reference density correction table 2, and letting i be the input density level of each of the reference density correction tables 1 and 2, a density correction table GLut obtained by the integration is calculated as follows in the relationship illustrated in FIG. 6:

for (i=0; i<255; i++)

GLut[i]=(std2x−px)/(std2x−std1x)×StdLut1[i]+(px−std1x)/(std2x−std1x)×StdLut2[i]

As described above, when the density correction table integration unit 403 integrates the reference density correction tables, the density correction table creation unit 306 creates the density correction table.

When the pixel drawing position px is less than the reference position of the reference density correction table A, or when the pixel drawing position px is more than the reference position of the reference density correction table E, the number of reference density correction tables to be selected may be one. In the case, the reference density correction table may be directly used as the density correction table.

Calculation of position information about each of pixels in the position information calculation unit 401 will be described below.

In the image processing apparatus 203, layout processing such as rotation and position adjustment may be performed by temporarily storing image data in a storage device such as a memory or a hard disk drive. Image data including a dot pattern after halftone processing having a smaller data capacity than that of multi-gradation image data may be stored. In this case, the layout processing such as rotation and position adjustment is performed for the image data after the halftone processing. On the other hand, the density correction processing may be generally performed before the halftone processing. Therefore, when the density correction processing based on a drawing position is performed, the drawing position and the density correction processing need to be associated with each other in consideration of layout processing after the density correction processing. The position information calculation unit 401 calculates a drawing position in the main-scanning direction of the image forming area based on a resolution and a sheet size during printing and layout information about rotation and position adjustment for each of the pixels in the image data.

FIG. 7 illustrates an example of position information calculation according to the present exemplary embodiment. If one image is imposed on one page, and rotation processing is not performed, density correction is performed using the reference density correction tables A, B, C, D, and E respectively corresponding to positions in a main-scanning direction of pixels in image data 705, as illustrated in FIG. 7.

In each of image data 701 and 702 illustrated in FIG. 7, two images are imposed on one page. The image data 701 indicates an output result. The image data 701 indicates how two images respectively written as "B" and "F" are imposed on one page. The image data 702 indicates a relationship between a position in the main-scanning direction of an image forming area when the image data is drawn and respective reference positions of reference density correction tables. Positions indicated by dotted lines A, B, C, D, and E are respective reference positions of the reference density correction tables A, B, C, D, and E. On the other hand, image data 703 written as "F" indicates a bit map image after rendering. Image data 704 indicates a relationship between the reference positions of the reference density correction tables and the image data when the density correction processing is performed for the bit map image indicated by the image data 703.

The image data 704 written as "F" indicates that the reference density correction tables do not change relative to a change in a horizontal direction. On the other hand, the image data 704 indicates that the reference density correction tables change relative to a change in a vertical direction. In the position information calculation unit 401, when rotation applied after the density correction processing is assumed to calculate drawing position information about each of the pixels, an appropriate density correction table can be created. The image data 704 is rotated in the layout processing unit 304 after the density correction processing in the density correction processing unit 302. Therefore, the reference density correction tables A, B, C, D, and E are applied in a vertical direction (sub-scanning direction) of the image data 704.

Figure 8:
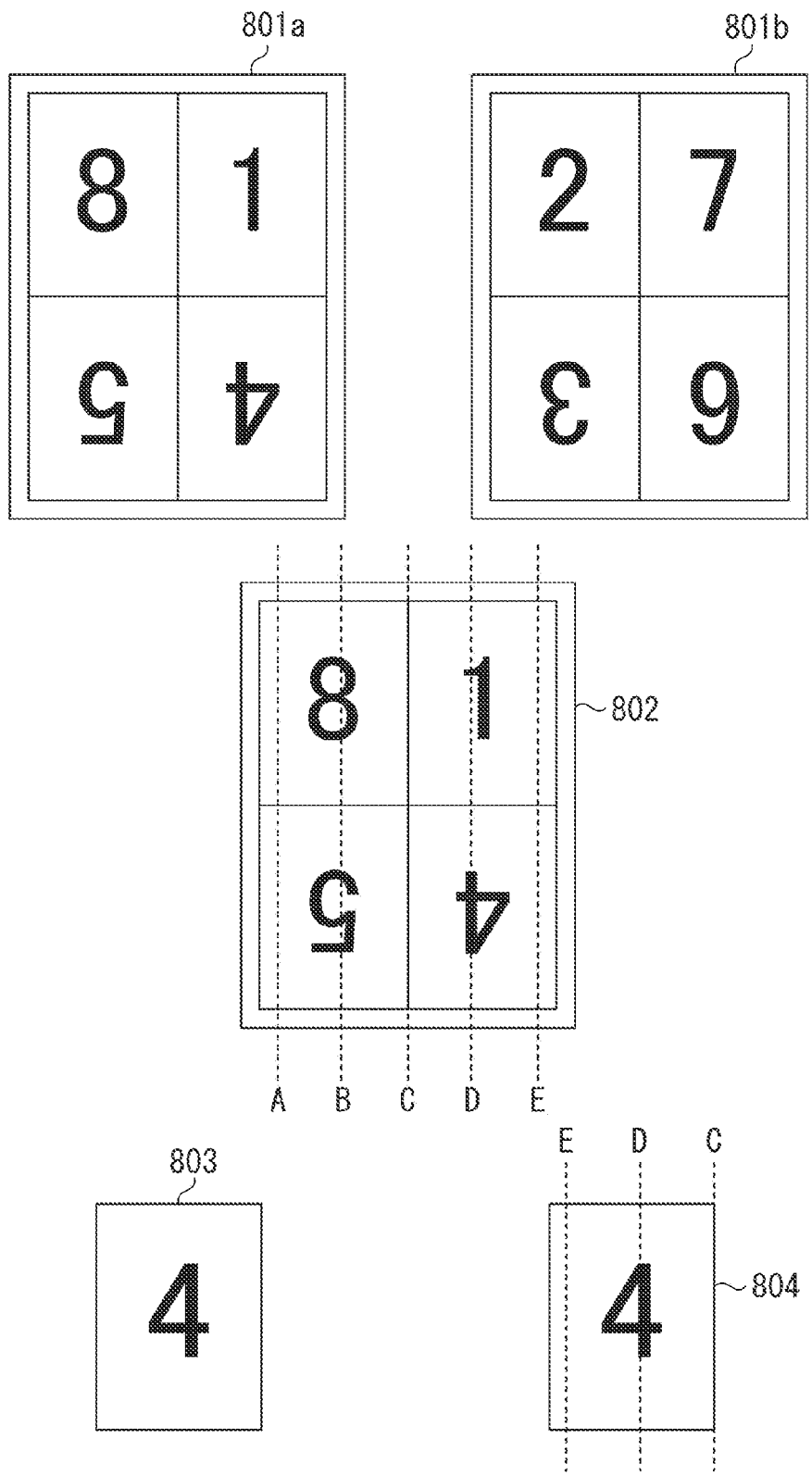
FIG. 8 illustrates an example of position information calculation according to one or more aspects of the present disclosure.

FIG. 8 illustrates another example of the position information calculation according to the present exemplary embodiment. FIG. 8 illustrates an example in which four images are imposed on one page and printed on both surfaces of the page, to create a 8-page miniature brochure as a finish. Image data 801a and 801b respectively indicate output results. The image data 801a and 801b respectively indicate the output results on a front surface and a back surface, and numerals described on the surface correspond to page numbers while indicating a vertical direction. Image data 802 indicates a relationship between a position in a main-scanning direction of an image forming area where the image data 801a and 801b are drawn and respective reference positions of reference density correction tables. Positions indicated by dotted lines A, B, C, D, and E are respective reference positions of reference density correction tables, like in the example illustrated in FIG. 7. Image data 803 written as "4" indicates a bit map image after rendering. Image data 804 indicates a relationship between the reference positions of the reference density correction tables and the image data when the density correction processing is performed for the bit map image indicated by the image data 803. In the image data 804 written as "4", the reference density correction tables change relative to a change in a horizontal direction. On the other hand, an increase in a horizontal direction and switching of the reference density correction tables are in an opposite direction to the reference position in the main-scanning direction of the image forming area. The reference density correction table A and the reference density correction table B are not used as the reference density correction tables in the image data 804. In the position information calculation unit 401, when rotation and position adjustment applied after the density correction processing are assumed, and drawing position information about each of the pixels is calculated, an appropriate density correction table can be created.

Figure 9:
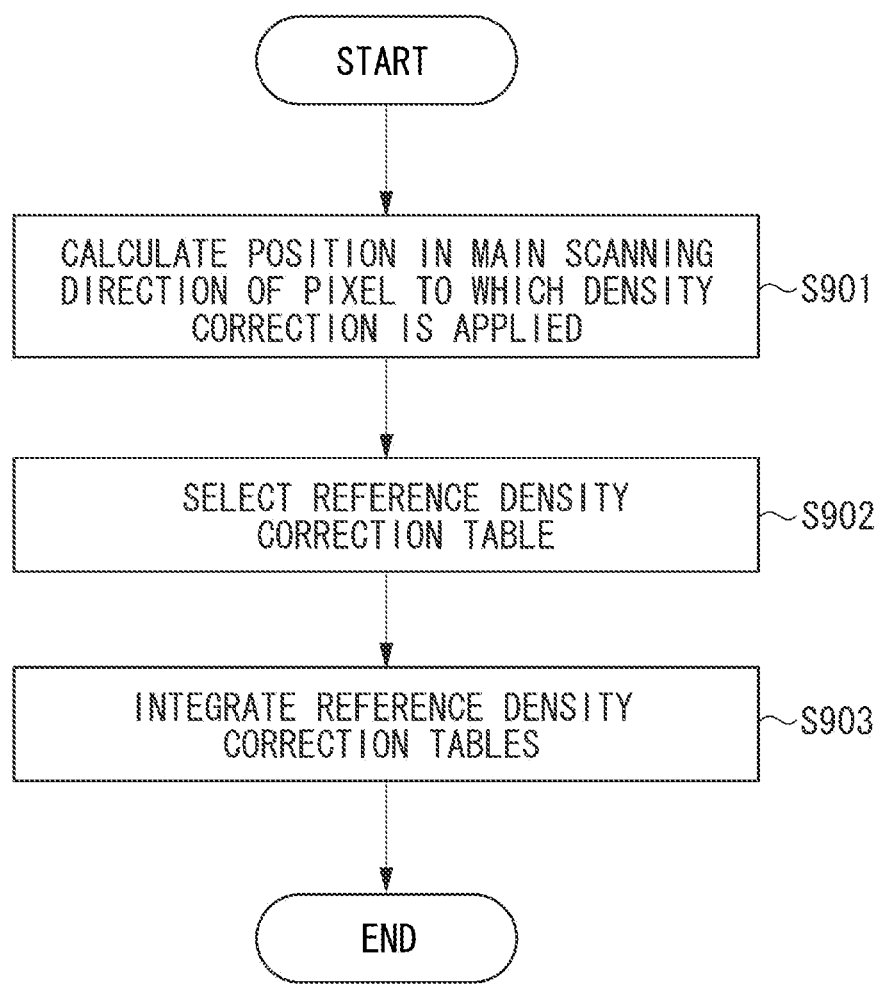
FIG. 9 is a flowchart illustrating an example of processes by the density correction table creation unit according to one or more aspects of the present disclosure.

FIG. 9 is a flowchart illustrating an example of processes by the density correction table creation unit 306. The flowchart is implemented when executed by the CPU 101 according to the program stored in the ROM 102.

In step S901, the position information calculation unit 401 calculates a drawing position in a main-scanning direction of an image forming area for each of pixels in image data from print setting information extracted by the printing information extraction unit 305. The following are the print setting information used when the drawing position is calculated:
  Rotation information
  Position adjustment information
  Resolution information
  Sheet size information
The rotation information is an angle or a left-to-right rotation. The position adjustment information is margin information of a sheet or shift information during imposition. The position adjustment information is not limited to this if related to position control in the main-scanning direction, e.g., margin information depending on a binding direction. The resolution information is information to calculate the drawing position in the main-scanning direction of each of the pixels. The sheet size information is a size of a sheet such as A4 or A5.

In step S902, the reference density correction table selection unit 402 determines reference density correction tables to be a basis in creating a density correction table from information about the calculated drawing position.

In step S903, the density correction table integration unit 403 creates a density correction table to be applied by integrating the selected reference density correction tables based on the drawing position information about each of the pixels.

As described above, according to the exemplary embodiment of the present disclosure, the drawing position of each of the pixels in the image data is calculated from the received print setting information. When the density correction table is created from the drawing position information calculated from the rotation information and the position adjustment information, the appropriate density correction table can be applied, and density nonuniformity in the main-scanning direction of the image forming area can be corrected with high accuracy.

In the above described first exemplary embodiment and a second exemplary embodiment to be described below, when the drawing position in the main-scanning direction of the image forming area of each of the pixels in the image data is calculated, the printing information extracted from the print setting is used. In the first exemplary embodiment, an example using the rotation information and the position adjustment information has been described. In the second exemplary embodiment, an example using sheet size information will be described.

A basic configuration of an image processing apparatus according to the second exemplary embodiment is similar to that according to the first exemplary embodiment, so that detailed description thereof is omitted.

Figure 10:
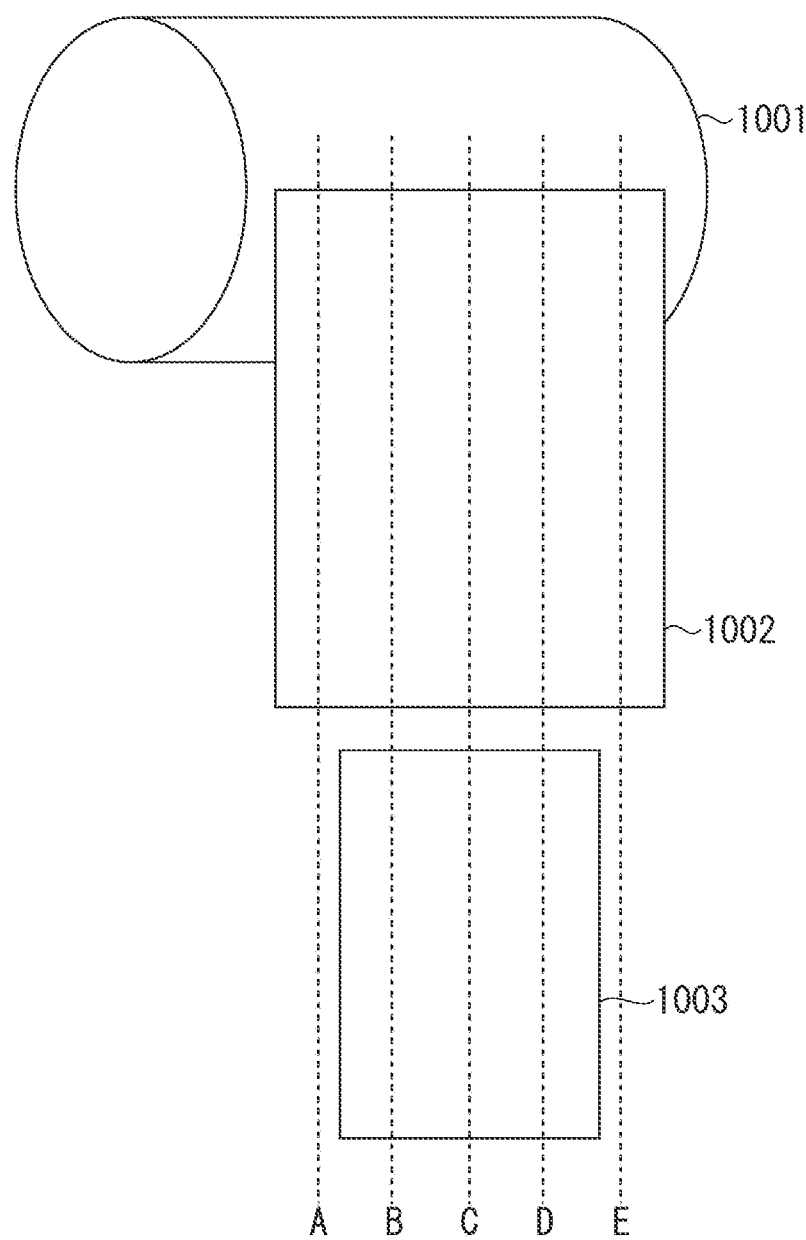
FIG. 10 illustrates a difference between a sheet size and a drawing position in a main-scanning direction of an image forming area according to one or more aspects of the present disclosure.

FIG. 10 illustrates a difference between a sheet size and a drawing position in a main-scanning direction of an image forming area. A photosensitive drum 1001 illustrated in FIG. 10 is arranged in a printer engine 209 illustrated in FIG. 2. In the present exemplary embodiment, a density correction table is associated with the main-scanning direction of the image forming area. A position in the main-scanning direction of the image forming area can be equivalent to a position on the photosensitive drum 1001. A Beam Detect (BD) sensor is installed in the vicinity of a scanning start position in the main-scanning direction, and detects a laser beam from an exposure device prior to scanning on the photosensitive drum 1001. A detected BD signal is used as a scanning start reference signal in the main-scanning direction. Respective writing start positions in the main-scanning direction of lines are synchronized based on the BD signal.

Reference positions of reference density correction tables are respectively indicated by dotted lines in FIG. 10. Sheets of different sizes are respectively a sheet 1002 and a sheet 1003. As can be seen from FIG. 10, when the sheets pass through the center of the photosensitive drum 1001, a position of an edge of the respective sheets relative to the reference position of the reference density correction table changes depending on the size of the respective sheets. Even if a drawing position of image data is the same within a sheet surface, the density correction table needs to be changed depending on the sheet size.

When the sheet size thus differs, a writing start position in the main-scanning direction of the image forming area also differs. Therefore, the sheet size is also used as printing information.

As described above, according to the exemplary embodiment of the present disclosure, the drawing position of each of the pixels in the image data is calculated from print setting information. In this case, when the density correction table is created from information about the drawing position calculated in consideration of the sheet size, the density correction table can be appropriately applied, and density nonuniformity in the main-scanning direction of the image forming area can be corrected with high accuracy.

In the description of the first exemplary embodiment, an example in which the density correction table is created for each of the pixels to which the density correction processing is applied. The density correction table respectively associates the output density levels with all the input density levels. It takes time to create the density correction table for each of the pixels. In a third exemplary embodiment, an example in which density correction processing is implemented without creating a density correction table will be described.

While a basic configuration of an image processing apparatus in the third exemplary embodiment is similar to that according to the first exemplary embodiment, the density correction table creation unit 306 described in FIG. 3 does not exist.

Figure 11:
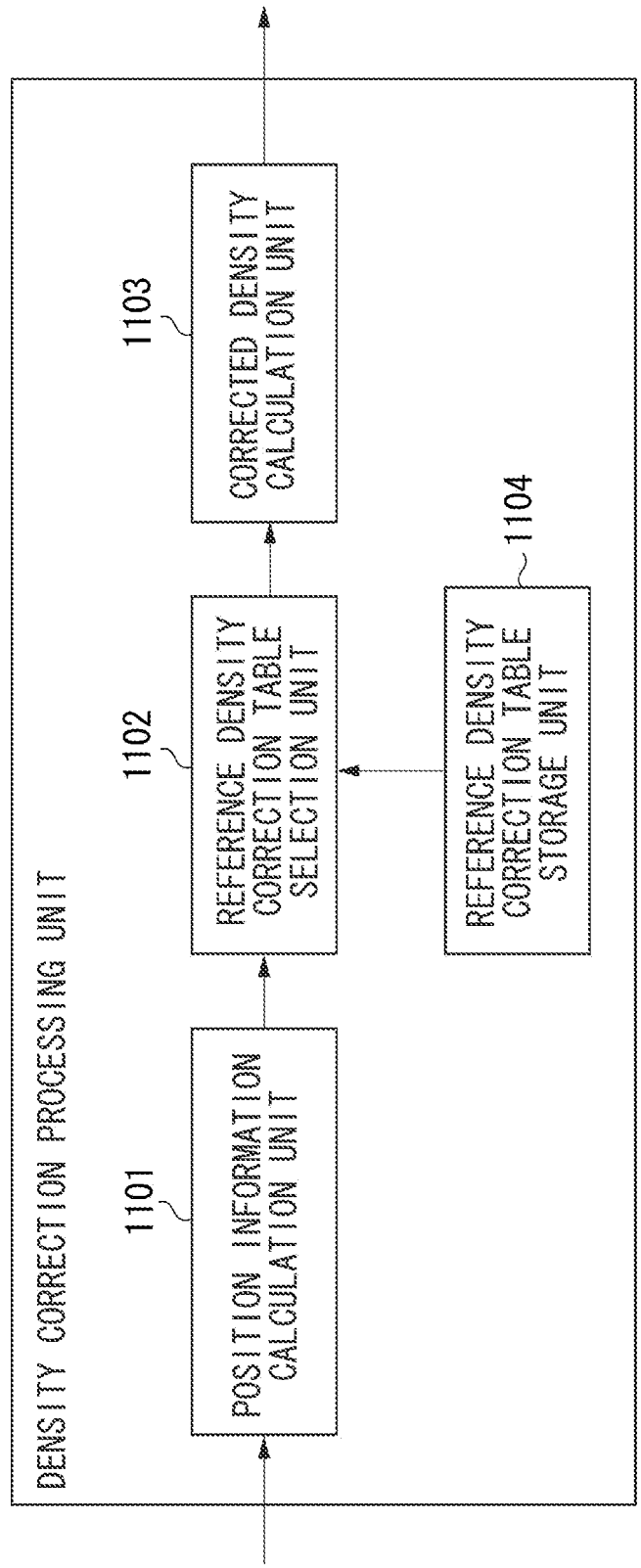
FIG. 11 is a block diagram illustrating a configuration of a density correction processing unit according to one or more aspects of the present disclosure.

FIG. 11 is a block diagram illustrating a configuration of a density correction processing unit in the third exemplary embodiment. A position information calculation unit 1101, a reference density correction table selection unit 1102, a reference density correction table storage unit 1104 are respectively similar to the position information calculation unit 401, the reference density correction table selection unit 402, and the reference density correction table storage unit 404 described in the first exemplary embodiment.

First, the position information calculation unit 1101 calculates a drawing position in a main-scanning direction of an image forming area for each of pixels in image data from print setting information extracted by the printing information extraction unit 305.

Next, the reference density correction table selection unit 1102 selects a reference density correction table stored in the reference density correction table storage unit 1104 from information about the calculated drawing position.

While the density correction table is created by further integrating the plurality of reference density correction tables in the first exemplary embodiment, a corrected density calculation unit 1103 calculates a corrected density in the third exemplary embodiment. The calculation of the corrected density in the corrected density calculation unit 1103 is performed as follows. A case illustrated in FIG. 6 will be described below as an example, like in the first exemplary embodiment.

Letting id be an input density level of each of the pixels in the image data before density correction is performed, and letting od be an output density level after the density correction, the calculation is performed as follows:

$$od=(std2x-px)/(std2x-std1x)\times StdLut1[id]+(px-std1x)/(std2x-std1x)\times StdLut2[id]$$

When the calculation is performed as described above, the corrected density of each of the pixels can be calculated without creating a density correction table.

As described above, according to the exemplary embodiment, the drawing position of each of the pixels in the image data is calculated from the print setting information. When the corrected density is calculated from information about the calculated drawing position, density nonuniformity in the main-scanning direction of the image forming area can be corrected with high accuracy.

According to the present disclosure, even when a layout of an image has been changed after the density of the image has been corrected, density nonuniformity in the main-scanning direction of the image forming area can also be corrected with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-016363, filed Jan. 29, 2016, which is hereby incorporated by reference herein in its entirety.

What is claimed is:

1. An image forming apparatus which corrects a density characteristic in a main-scanning direction using a density correction table corresponding to a position in the main-scanning direction in an image forming area, the image forming apparatus comprising:

a storage which is able to store a plurality of density correction tables respectively corresponding to a plurality of positions in the main-scanning direction;

a memory storing instructions;

one or more processors which execute the instructions and cause the image forming apparatus to function as:

a receiving unit configured to receive a print setting for rotating image data;

a determination unit configured to determine a density correction table applied to a position of a pixel in the image data based on the print setting for rotating the image data received by the receiving unit from among the plurality of density correction tables in the storage; and a correction unit configured to correct a density of the pixel in the image data using the density correction table determined by the determination unit, wherein the determination unit respectively applies the plurality of stored density correction tables to positions in a sub-scanning direction of the image data so that the density correction tables applied to position of at least two pixels in the sub-scanning direction in the image data change.

2. The image forming apparatus according to claim 1, wherein the correction unit uses the density correction table applied to the pixel to correct the density of another pixel.

3. An image forming apparatus which corrects a density characteristic in a main-scanning direction using a density correction table corresponding to a position in the main-scanning direction in an image forming area, the image forming apparatus comprising:
   a storage which is able to store a plurality of density correction tables respectively corresponding to a plurality of positions in the main-scanning direction;
   a memory storing instructions;
   one or more processors which execute the instructions and cause the image forming apparatus to function as:
   a receiving unit configured to receive a print setting for imposing two images on one page;
   a determination unit configured to determine a density correction table applied to a position of a pixel in image data based on the print setting received by the receiving unit from among the plurality of density correction tables in the storage; and
   a correction unit configured to correct a density of the pixel in the image data using the density correction table determined by the determination unit,
   wherein the determination unit respectively applies the plurality of stored density correction tables to positions in a sub-scanning direction of the image data so that the density correction tables applied to position of at least two pixels in the sub-scanning direction in the image data change.

4. An image forming apparatus which corrects a density characteristic in a main-scanning direction using a density correction table corresponding to a position in the main-scanning direction in an image forming area, the image forming apparatus comprising:
   a storage which is able to store a plurality of density correction tables respectively corresponding to a plurality of positions in the main-scanning direction;
   a memory storing instructions;
   one or more processors which execute the instructions and cause the image forming apparatus to function as:
   a receiving unit configured to receive a print setting for image data;
   a determination unit configured to determine a density correction table applied to a position of a pixel in the image data based on the print setting received by the receiving unit from among the plurality of density correction tables in the storage; and
   a correction unit configured to correct a density of the pixel in the image data using the density correction table determined by the determination unit; and
   a rotation processing unit configured to rotate the image data which has been corrected by the correction unit.

5. The image forming apparatus according to claim 4, wherein the print setting includes at least one of rotation of an image, position adjustment of the image, a resolution of the image, and a size of a sheet on which the image is to be printed.

6. The image forming apparatus which corrects a density characteristic in a main-scanning direction using a density correction table corresponding to a position in the main-scanning direction in an image forming area, the image forming apparatus comprising:
   a storage which is able to store a plurality of density correction tables respectively corresponding to a plurality of positions in the main-scanning direction;
   a memory storing instructions;
   one or more processors which execute the instructions and cause the image forming apparatus to function as:
   a receiving unit configured to receive a print setting for image data;
   a determination unit configured to determine a density correction table applied to a position of a pixel in the image data based on the print setting received by the receiving unit from among the plurality of density correction tables in the storage;
   a correction unit configured to correct a density of the pixel in the image data using the density correction table determined by the determination unit; and
   an imposition processing unit configured to impose the image data which has been corrected by the correction unit.

7. An image forming method for correcting a density characteristic in a main-scanning direction using a density correction table corresponding to a position in the main-scanning direction in an image forming area, the image forming method comprising:
   storing a plurality of density correction tables respectively corresponding to a plurality of positions in the main-scanning direction;
   inputting image data;
   receiving a print setting for rotating image data;
   determining a density correction table applied to a position of a pixel in the image data based on the received print setting for rotating the image data from among the plurality of stored density correction tables; and
   correcting a density of the pixel in the image data using the determined density correction table,
   wherein the determining respectively applies the plurality of stored density correction tables to positions in a sub-scanning direction of the image data so that the density correction tables applied to position of at least two pixels in the sub-scanning direction in the image data change.

8. An image forming method for correcting a density characteristic in a main-scanning direction using a density correction table corresponding to a position in the main-scanning direction in an image forming area, the image forming method comprising:
   storing a plurality of density correction tables respectively corresponding to a plurality of positions in the main-scanning direction;
   receiving a print setting for image data;
   determining a density correction table applied to a position of a pixel in the image data based on the received print setting from among the plurality of stored density correction tables;
   correcting a density of the pixel in the image data using the determined density correction table; and
   rotating the image data which has been corrected by the correcting.

* * * * *